(12) United States Patent
Ganesan et al.

(10) Patent No.: US 12,014,591 B1
(45) Date of Patent: Jun. 18, 2024

(54) GRANTING ACCESS TO A SECURED AREA VIA A DOOR AND BASED ON A TRAVEL DOCUMENT

(71) Applicant: AMERICAN AIRLINES, INC., Fort Worth, TX (US)

(72) Inventors: Venkatasubramanian Ganesan, Irving, TX (US); Krishna Reddy Jeereddy, Flower Mound, TX (US); Alyson Jones, Fort Worth, TX (US); John Praveen Caleb Francis, Fort Worth, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

(21) Appl. No.: 17/935,620

(22) Filed: Sep. 27, 2022

Related U.S. Application Data

(63) Continuation of application No. 16/774,570, filed on Jan. 28, 2020, now Pat. No. 11,462,068.

(60) Provisional application No. 62/798,377, filed on Jan. 29, 2019.

(51) Int. Cl.
*G07C 9/20* (2020.01)
*G06K 7/10* (2006.01)
*G06K 7/14* (2006.01)

(52) U.S. Cl.
CPC .......... *G07C 9/20* (2020.01); *G06K 7/10544* (2013.01); *G06K 7/143* (2013.01); *G06K 2007/10524* (2013.01)

(58) Field of Classification Search
None
See application file for complete search history.

(56) References Cited

U.S. PATENT DOCUMENTS

| | | | |
|---|---|---|---|
| 2007/0200661 A1* | 8/2007 | Blum | G07C 9/20 340/5.24 |
| 2013/0221094 A1* | 8/2013 | Smith | G07C 9/00309 235/382 |
| 2015/0348382 A1* | 12/2015 | Michihata | G07C 9/00 382/103 |
| 2016/0247341 A1* | 8/2016 | Talwerdi | B42D 9/04 |
| 2016/0343187 A1* | 11/2016 | Trani | H01Q 9/0407 |
| 2019/0278955 A1* | 9/2019 | Mani | G06K 7/10366 |
| 2019/0279326 A1* | 9/2019 | Chen | H04L 9/30 |

* cited by examiner

*Primary Examiner* — Carlos Garcia
(74) *Attorney, Agent, or Firm* — HAYNES AND BOONE, LLP

(57) ABSTRACT

A system includes a door that selectively grants access to a secured area from a first area and a scanner accessible from the first area that is configured to read a scannable code of a travel document, such as a boarding pass, to identify travel details of a user and user details that are represented by the scannable code. The system also includes a converter in communication with the scanner, with the converter being configured to generate a first access key code based on the identified travel details and the identified user details. The system also includes a control panel in communication with the converter, with the control panel being configured to grant access to the secured area via the door in response to a comparison of the first access key code to a registered access key code.

31 Claims, 9 Drawing Sheets

GRANTING ACCESS TO A SECURED AREA VIA A DOOR AND BASED ON A TRAVEL DOCUMENT

CROSS-REFERENCE TO RELATED APPLICATIONS

This application is a continuation of U.S. application Ser. No. 16/774,570, filed Jan. 28, 2020, which claims the benefit of the filing date of, and priority to, U.S. Application No. 62/798,377, filed Jan. 29, 2019, the entire disclosures of which are hereby incorporated herein by reference.

BACKGROUND

Often, access to a lounge within an airport is restricted to a group of members. Not only is the access restricted to a group of members, but the access is restricted to a specific duration of time for each member. For example, when a member is planning to travel from the airport on a specific date, he or she is granted access to the lounge on that specific date.

Conventionally, when a member desires to enter the lounge, she presents her boarding pass to a lounge representative. Based on the boarding pass, the lounge representative confirms that the member is a member and that the member is traveling on an upcoming flight. The lounge representative then provides the member a physical key that unlocks a door to the lounge. Due to lounge access being dependent upon membership status and being time-restricted, the keys must be returned after use. While the member is instructed to return the physical key, there are multiple instances when the member does not return the physical key. As such, the physical keys must be replaced. Moreover, the physical keys must be gathered, cleaned, organized, etc.

DETAILED DESCRIPTION

Figure 1:
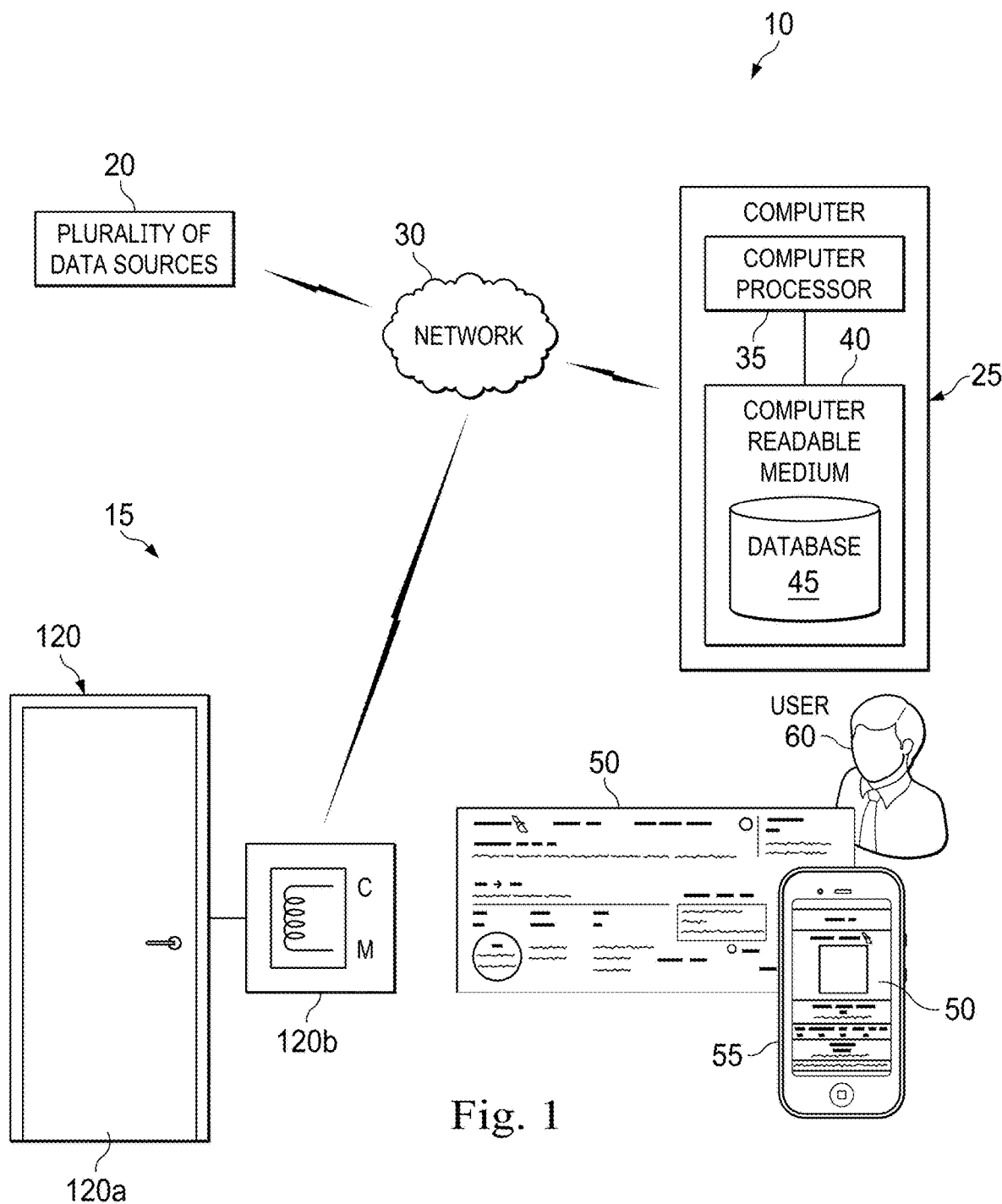
FIG. 1 is a diagrammatic illustration of a system that includes a door assembly that is configured to read a boarding pass associated with a user, a plurality of data sources, and a computer, according to an example embodiment.

In an example embodiment, referring to FIG. 1, a system 10 includes a door assembly 15; a plurality of data sources 20; and a computer 25, all of which are operably connected via a network 30. In some embodiments, the computer 25 includes a computer processor 35 and a computer readable medium 40 operably coupled thereto. Instructions accessible to, and executable by, the computer processor 35 are stored on the computer readable medium 40. A database 45 is also stored in the computer readable medium 40. Generally, the door assembly 15 temporarily and selectively provides access to a secured area, and the system 10 determines if access should be granted upon reading of a boarding pass 50, which is a travel document. The boarding pass 50 may be printed on paper or displayed on a mobile device 55 associated with a user 60.

In an example embodiment, the system 10 results in a seamless customer experience in that the user 60 scans his or her boarding pass to open the door assembly 15. This avoids the need for physical keys, which must be gathered, cleaned, organized, etc.

Figure 2:
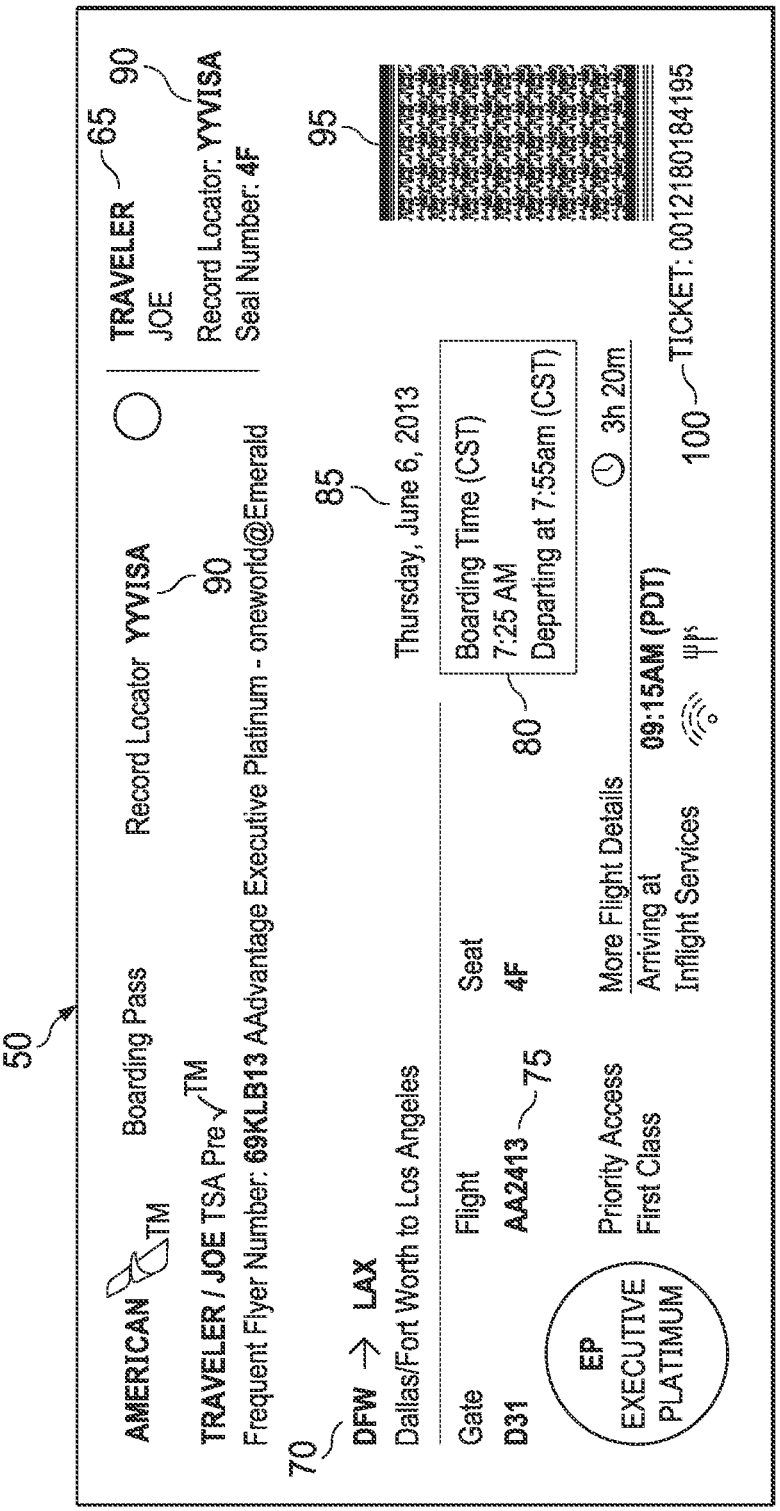
FIG. 2 is an illustration of the boarding pass of FIG. 1, according to an example embodiment.
Figure 3:
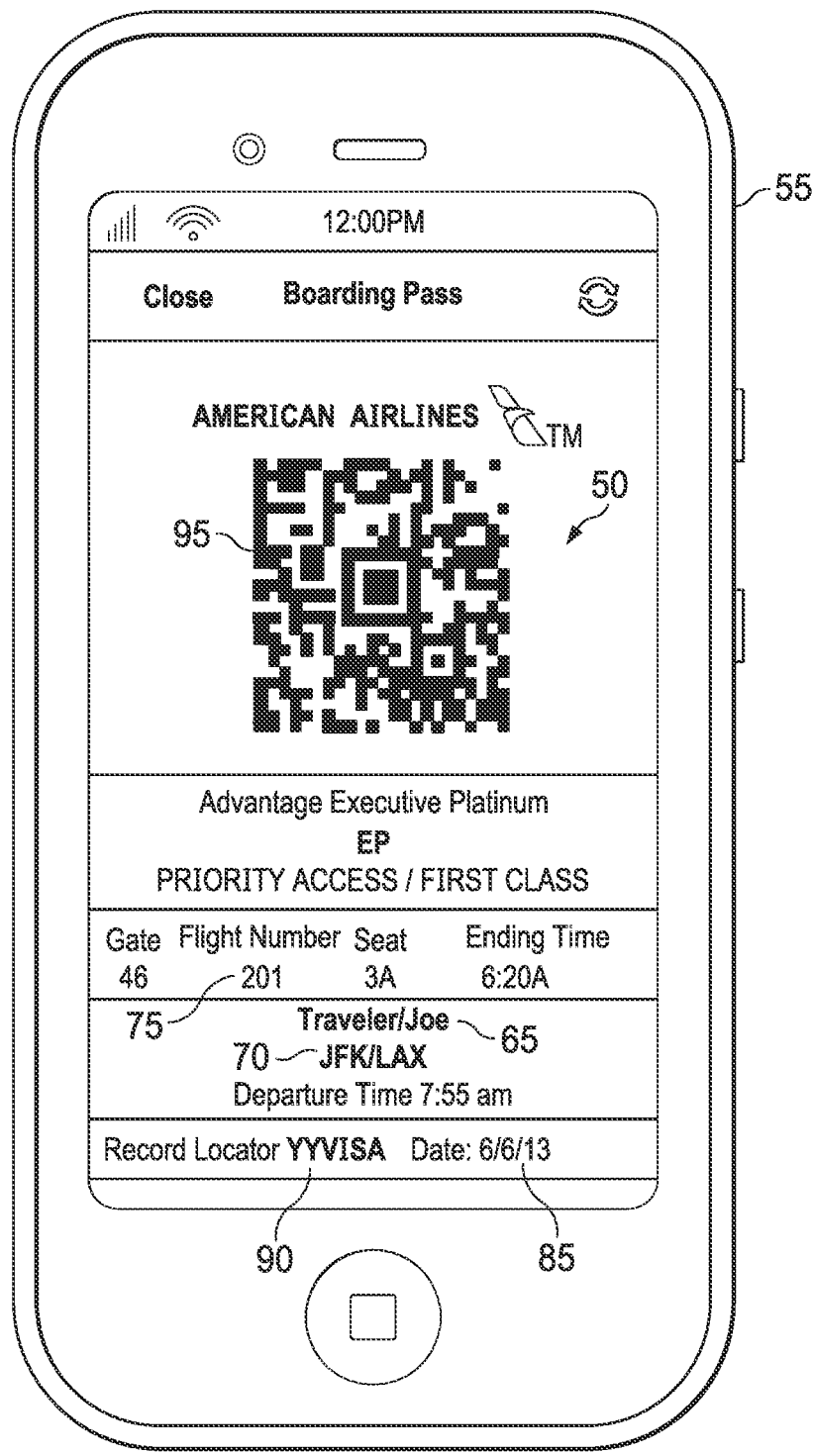
FIG. 3 is an illustration of another boarding pass of FIG. 1, according to an example embodiment.

In an example embodiment and as illustrated in FIG. 2, the boarding pass 50 generally displays a name 65 of the user 60, flight origination and destination locations 70, a flight number 75, a boarding time 80, a date 85 on which the travel will occur, a record locator 90, a scannable code 95, and a ticket number 100. In some embodiments, the scannable code 95 is a barcode that is machine readable and that represents data associated with the boarding pass 50. For example, the scannable code 95 may represent data displayed on the boarding pass 50 and additional information such as a passenger name record and an origination club location. In some embodiments, the scannable code 95 is a 2-D code, but it may also be a linear barcode or combination of both. The scannable code 95 may include a PDF-417 code, a data matrix, a quick response (QR) code, an Aztec code, a Maxicode, etc. In an example embodiment and as illustrated in FIG. 3, the mobile device 55 displays the boarding pass 50, which includes the name 65 of the user 60, the flight origination and destination locations 70, the flight number 75, the date 85 on which the travel will occur, the record locator 90, and the scannable code 95. Generally, the boarding pass 50 is a travel document.

Figure 4:
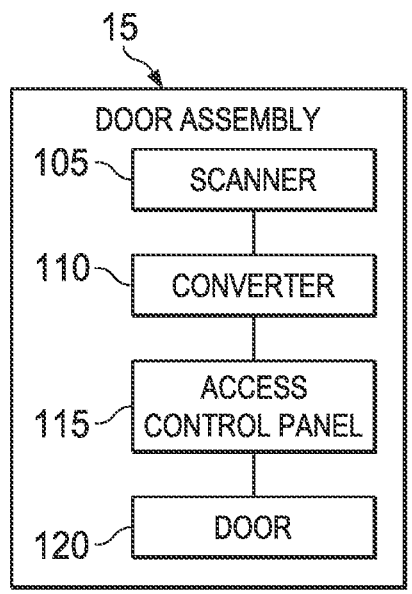
FIG. 4 is a diagrammatic illustration of the door assembly of FIG. 1, according to an example embodiment.

In an example embodiment and as illustrated in FIG. 4, the door assembly 15 includes a scanner 105, a converter 110, an access control panel 115, and a lockable door 120 that are operably coupled. Generally, the door assembly 15 is positioned between a secured area and a less-secure area or location, such as an airport terminal. That is, the door assembly 15 is an access point to the secured area from an airport terminal or other area. An example of a secured area is an area into which entrance is resisted, monitored, restricted, etc. While the door assembly 15 may include a traditional door panel that opens and closes relative to a door frame, the door assembly 15 also includes pocket doors, roller doors, sliding door, bifold doors, etc.

Generally, the door 120 grants access, selectively, to the secured area, such as a customer lounge, etc. In some embodiments, the door 120 includes a door panel 120a and a lock 120b, both of which are shown in FIG. 1. The lock 120b has a first configuration in which the lock 120b is unlocked and a second configuration in which the lock 120b is locked to prevent the opening of the door panel 120a. In some embodiments, and as shown in FIG. 1, the lock 120b is a magnetic lock including an electromagnet attached to a frame of the door and an armature plate attached to the door panel 120a. When an electric current is passed through the electromagnet, it attracts the plate to prevent the door panel 120a from opening. In some embodiments, the lock 120b includes an electronic door strike, an electric bolt lock, etc.

As noted above, the door 120 of the door assembly 15 includes a variety of structures.

In some embodiments, the scanner 105 is positioned to be accessible from the less-secure area. In some embodiments, the scanner 105 is configured to read the scannable code 95 when the boarding pass 50 (printed or displayed on the mobile device 55) is positioned near the scanner 105. In some embodiments, upon reading the scannable code 95, the scanner 105 identifies data represented by the code 95. In some embodiments, the scanner 105 identifies, upon reading the boarding pass 50, at least a passenger name record (PNR) associated with the user 60, the flight number 75, the first name of the user 60, the last name of the user 60, and an origination club location. In some embodiments, the scanner 105 reads the code that is printed on paper or the code directly from mobile devices or computer screens. In some embodiments, the scanner 105 is a compact area-imaging scanner that reads all 1 D, PDF, and 2D barcodes. In some embodiments, decoding and formatting plug-ins are loaded directly on the scanner 105. In some embodiments, the scanner 105 is a Vuguest 3320 g Area-Imaging Scanner from Honeywell of Morristown, New Jersey, USA.

In some embodiments, the converter 110 is configured to receive the data identified by the scanner 105 and to generate a Wiegand code using the data identified by the scanner 105. In some embodiments, the converter 110 provides data format and protocol translations of numerous card reader technology outputs into almost any other standard or proprietary format. In some embodiments, the converter 110 connects dissimilar card, tag, badge, and biometric readers to previously incompatible controllers. In some embodiments, the converter 110 supports Wiegand, Serial ASCII, F2F and Clock and Data conversions. In some embodiments, the converter 110 converts bar-code serial ASCII data to Wiegand and adapts uncommon Wiegand formats to common Wiegand formats. In some embodiments, the converter 110 is a CVX-1300 DataBender™ Universal Format Converter from Cypress Computer Systems, Inc. of Lapeer, MI, USA.

In some embodiments, the access control panel 115 controls the operation of the lock 120b of the door to move the lock 120b between the first and second configurations. In some embodiments, the access control panel 115 controls the opening of the door 120. In some embodiments, the access control panel 115 controls the opening of the door 120 and doors similar to the door 120. In some embodiments, the access control panel 115 connects the door assembly 15 to the computer 25 via the network 30. In some embodiments, the access control panel 115 functions as a controller, as a reader connection, and as input/output (I/O) management. In some embodiments, the read connection is Wiegand or RS485 via open supervised device protocol (OSDP) protocol. In some embodiments, the access control panel 115 is directly IP connected and supports both power over ethernet (POE) and POE+ to directly manage the unlocking and locking of the door 120. In some embodiments, the access control panel 115 is completely autonomous, with a database onboard. In some embodiments, the access control panel 115 is a Tema-Voyager TM Multi from Honeywell of Morristown, New Jersey, USA.

In an example embodiment, the plurality of data sources 20 includes data sources that include data relating to upcoming flight plans of users or customers, flight schedules, flight numbers and origination location and departure destination for each flight number, passenger data, etc.

Figure 5:
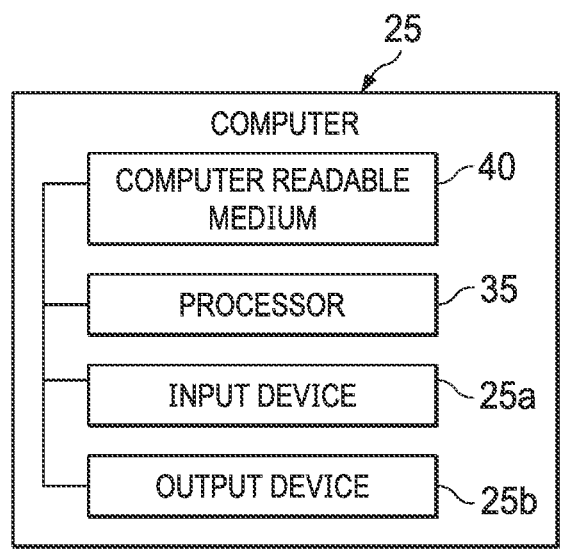
FIG. 5 is a diagrammatic illustration of the computer of FIG. 1, according to an example embodiment.

In an example embodiment, as illustrated in FIG. 5 with continuing reference to FIG. 1, the computer 25 also includes an input device 25a and an output device 25b. In some embodiments, the input device 25a and the output device 25b are a graphical user interface. In several example embodiments, the computer 25 is, or includes, a telephone, a personal computer, a personal digital assistant, a cellular telephone or mobile phone, other types of telecommunications devices, other types of computing devices, and/or any combination thereof.

In some embodiments, the mobile device 55 is similar to the computer 25 in that the mobile device 55 includes a computer processor and a computer readable medium operably coupled thereto. Instructions accessible to, and executable by, the computer processor are stored on the computer readable medium of the mobile device 55. A database is also stored in the computer readable medium of the mobile device 55. The mobile device 55 includes an input device and an output device. In some embodiments, the input device and the output device are a graphical user interface. In several example embodiments, the mobile device 55 is, or includes, a telephone, a personal computer, a personal digital assistant, a cellular telephone or mobile phone, other types of telecommunications devices, other types of computing devices, and/or any combination thereof. Generally, the mobile device 55 is configured to display the boarding pass 50.

In an example embodiment, the network 30 includes the Internet, one or more local area networks, one or more wide area networks, one or more cellular networks, one or more wireless networks, one or more voice networks, one or more data networks, one or more communication systems, and/or any combination thereof.

Figure 6:
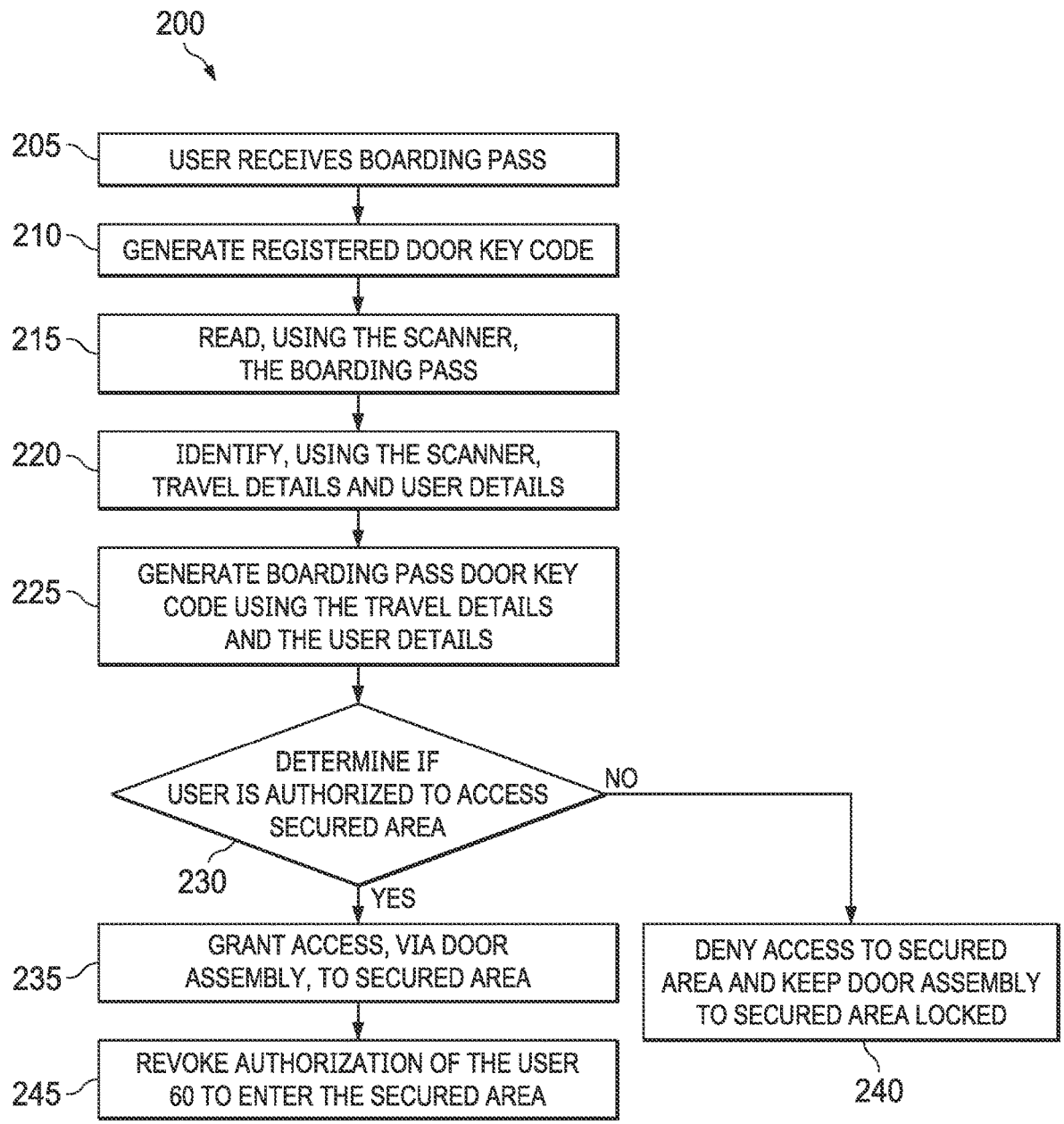
FIG. 6 is a flow chart illustration of a method of operating the system of FIG. 1, according to an example embodiment.

FIG. 6 illustrates a method 200 of granting access to the secured area using the system 10. The method 200 includes the user 60 receiving the boarding pass 50 at step 205; generating a registered door key code at step 210; reading, using the scanner 105, the boarding pass 50 at step 215; identifying travel details and user details at step 220; generating a boarding pass door key code using the travel details and the user details at step 225; determining if the user 60 is authorized to access the secured area at step 230; either granting access, via the door assembly 15, to the secured area at step 235 or denying access to the secured area and keeping the door assembly 15 locked at step 240; and revoking authorization of the user 60 to enter the secured area at step 245.

At the step 205, the user 60 receives the boarding pass 50. In some embodiments, the user 60 receives the boarding pass 50 upon physically checking in at a kiosk or service desk. When physically checking in, the boarding pass 50 is printed on paper and physically given to the user 60. However, in other embodiments, the user 60 can print the boarding pass 50 at a location remote from the kiosk or service desk. In other embodiments, the user 60 receives an electronic boarding pass 50 upon electronically checking in via his or her mobile device 55, etc. When electronically checking in, the electronic boarding pass 50 is emailed to the user 60, is available for viewing via a mobile application associated with an airline that is displayed on the mobile device 55, etc. Generally, the electronic boarding pass 50 is capable of being displayed on the mobile device 55, as illustrated in FIG. 3.

Figure 7:
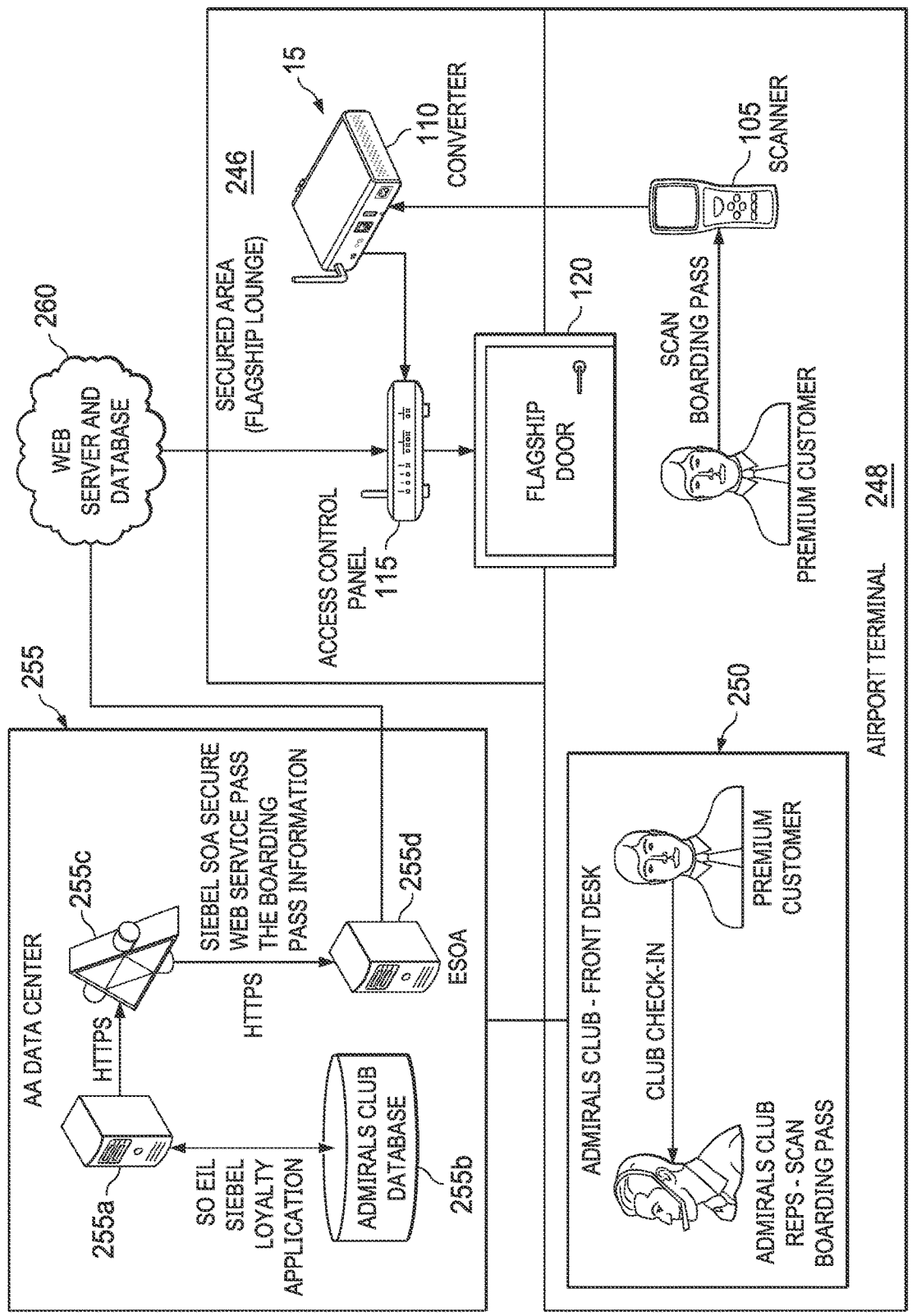
FIG. 7 illustrates a high level conceptual architecture associated with the system of FIG. 1, according to an example embodiment.

Returning back to FIG. 6 and at the step 210, a registered door key code is generated. FIG. 7 illustrates a high level conceptual architecture associated with the system 10. As illustrated, the door 120 of the door assembly 15 is positioned between a secured area 246 and an airport terminal 248 or the less-secure area (relative to the secured area 246).

In some embodiments, the registered door key code is generated when the user 60 checks-in at a customer service center 250 or kiosk. When the user 60 checks in at the customer service center 250, a Soleil system 255 sends travel details and user details associated with the user 60 to a cloud-based web server and database 260 that is in communication with the door assembly 15. In some embodiments, the customer service center 250 is located within the airport terminal 248 but spaced from the access control panel 115 and/or the scanner 105. In some embodiments, the customer service center 250 is spaced from the web server and database 260 and/or the secured area 246. In some embodiments, the travel details and user details are the details or information listed on the boarding pass 50. However, the travel details and the user details can include less or more information. For example, the travel details and the user details may also include the PNR, etc. In some embodiments, the Soleil system 255 hosts a web service to allow an Enterprise Service Oriented Architecture (ESOA) to push boarding pass registration information to a web service hosted on the cloud-based web server and database 260. In some embodiments, the cloud-based web server and database 260 includes a processor that is spaced from the door assembly 15 and/or the customer service center 250.

In some embodiments, the customer service center 250 includes the computer 25 or a computer that is similar to the computer 25 and that is in communication with the computer 25. Generally, the customer service center 250 is positioned in the less-secure area 248 and a customer representative is positioned at the customer service center 250 to interact with the user 60 and register the user 60 with the Soleil system 255.

In some embodiments, the Soleil system 255 includes the computer 25 or a computer that is similar to the computer and that is in communication with the computer 25. Generally, the Soleil system 255 includes an application 255*a*, a database 255*b*, a web service 255*c*, and or on an ESOA 255*d*. In some embodiments, the Soleil system 255 pushes boarding pass registration information to the cloud-based web server and database 260 and periodically retrieves door access information.

In some embodiments, the cloud-based web server and database 260 includes a Honeywell Enterprise Buildings Integration (EBI) server and a SQL database, hosted by Honeywell of Morristown, New Jersey, USA. In some embodiments, the cloud-based web server and database 260, the customer service center 250, the Soleil system 255, and the door assembly 15 are in communication via the network 30.

In some embodiments and upon receipt of new information from the Soleil system 255 due to the registration of the user 60 at the customer service center 250, the incoming data will be interpreted and entered into an access control database of the cloud-based web server and database 260. Generally, the cloud-based web server and database 260 receives the travel details and the user details and then generates the registered door key code. That is, the PNR data that is received from the Soleil system 255 is hashed to the Wiegand code, and then stored or communicated within the cloud-based web server and database 260 in that form. In some embodiments, the registered door key code is a Wiegand code, which is an uniquely identifiable thirty-two (32) digit number and letter combination, such as for example the PNR associated with the user 60, the flight number 75, up to the first 5 letters of the first name of the user 60, up to the first 5 letters of the last name of the user 60, and an origination club location such as for example Dallas/Fort Worth (DFW), Los Angeles, CA (LAX), etc. In some embodiments, the registered door key code is then sent from the cloud-based web server and database 260 to the door assembly 15. That is, the cloud-based web server and database 260 downloads the Wiegand code and a status of the Wiegand code to the access control panel 115 of the door assembly 15. In some embodiments, the cloud-based web server and database 260 hosts a web service endpoint that will allow the ESOA 255*d* to pass notifications of new boarding pass registrations; hosts a web service endpoint that will provide information regarding access activity to the door assembly 15; and hosts a web service endpoint for 'keep alive' notifications. Generally, the cloud-based web server and database 260 utilizes a newly defined table in the access control database (CMS) to store status information. In some embodiments, this table is prefixed in a manner to identify its custom nature. In some embodiments, the table is configured in a manner to allow for replication across multiple databases and preservation upon re-initialization of the database.

In some embodiments, the registered door key code is generated upon creation of the boarding pass 50. That is, when the user 60 checks in with the airline, the registered door key code is generated. For example, when a boarding pass 50 is issued, the registered door key code is generated and stored. In this embodiment, visiting the customer service center 250 is not required for the generation and storage of the registered door key code. In some embodiments and when the system 10 generates the registered door key code upon issuing the boarding pass 50, the registered door key code is associated with a status of not valid if the departure time is not within a predetermined period of time. However, the status is changed from not valid to valid when the departure time is within the predetermined period of time. For example, when the user 60 checks in 24 hours prior to his or her departure time, the system 10 generates a registered door key code, but the status is "not valid" so that the user 60 is not granted access to the secured area 246 24 hours prior to departure. However, when his departure is within three hours, or the predetermined period of time, the status is changed from "not valid" to "valid" and thus the user 60 is granted access to the secured area 246. In some embodiments, the system 10 automatically generates and stores the registered door key code within the predetermined period of time. For example, the user 60 checks in 24 hours prior to his or her departure time and the system 10 delays generating and storing a registered door key code until three hours, or the predetermined period of time, before the user's flight.

At the step 215 and turning back to FIG. 6, the boarding pass 50 is scanned or read using the scanner 105. In some embodiments, the step 210 includes positioning the boarding pass 50, or the mobile device 55 on which the boarding pass 50 is displayed, next to the scanner 105 such that the scanner 105 reads the scannable code 95.

At the step 220, the system 10 identifies travel details and user details using the scanner 105. In some embodiments, the scanner 105, upon reading the scannable code 95, identifies at least the PNR associated with the user 60, the flight number 75, the first name of the user 60, the last name of the user 60, and an origination club location. However, in some embodiments the scanner 105 reads printed items other than the scannable code 95.

At the step 225, the converter 110 creates or generates a boarding pass door key code using the identified travel details and the identified user details. In some embodiments, the boarding pass door key code is a Wiegand code based on the same information as used to create the registered door key code. That is, the converter 110 creates a Wiegand code that is identical to the Wiegand code of the registered door key code.

At the step 230, the system 10 determines if the user 60 is authorized to access the secured area 246. In some embodiments, the registered door key code and an associated status are sent from the cloud-based web server and database 260 and stored in the access control panel 115 of the door assembly 15. However, the registered door key code can be stored in other databases or memory associated with the door assembly 15. At the step 230, the access control panel 115 determines whether the boarding pass door key code is identical to the registered door key code. That is, the system 10 compares the boarding pass key code, which is an access key code, with registered key codes and determines whether the boarding pass key code matches with one of the registered key codes. Moreover, in some embodiments, at the step 230, the access control panel 115 also determines whether the matched registered door key code has a status that authorizes the user 60 to enter the secured area 246. That is, does the registered door key code have a "valid," "authorized," or "success" status or a "not valid," "invalid," "unauthorized," or "declined" status. In other embodiments, the registered door key codes and associated status is not stored in the door assembly 15, and the door assembly sends a request or query to the cloud-based web server and database 260 regarding the boarding pass door key code. The same process of identifying and checking the status occurs at the cloud-based web server and database 260 and the status is sent to the door assembly 15.

In some embodiments, the registered door key code is one of a plurality of registered door key codes that form a listing of registered door key codes. Each of the registered door key codes is associated with a user that has or will have access to the secured area 246. In some embodiments, the listing of registered door key codes is dynamic in that the listing changes over time in part based on the departure of users' flights and the checking in of users. The door assembly 15 references the dynamic listing of approved codes when comparing the boarding pass key code with the registered access key code. In some embodiments, the dynamic listing of approved codes includes hundreds, thousands, or hundreds of thousands of registered access key codes. In some embodiments, the door assembly 15 does not send any information or data to the code 95 and/or the boarding pass 50. Instead, the door assembly 15 receives information from the code 95 and/or the boarding pass 50, compares the information received with the dynamic listing of registered door key codes, and determines whether the user 60 is granted access.

At the step 235, when the boarding pass key code matches with a registered key code and when the status is "valid," "authorized," or "success," the access control panel 115 moves the lock 120b of the door assembly 15 from the locked configuration to the unlocked configuration or otherwise grants access to the secured area 246. In some embodiments and when there is no status associated with a registered key code, the matching of the boarding pass key code with a registered key code causes the door assembly 15 to provide access to the restricted area 246. In some embodiments, the access control panel 115 also opens the door panel 120a of the door assembly 15.

At the step 240, when the boarding pass key code does not match with a registered key code or when the boarding pass key code does match with a registered key code but the status associated with the matched registered key code is "invalid," "unauthorized," or "declined," the access control panel 115 denies access to the secured area 246 and keeps the door assembly 15 locked to the secured area 246 or otherwise denies access to the secured area 246.

At the step 245, the system 10 revokes authorization of the user 60. In some embodiments, the system 10 revokes authorization of the user 60 after a predetermined period of time. In some example embodiments, revoking authorization of the user 60 comprises changing the status associating with the registered access key code from "valid," "authorized," or "success" to "not valid," "invalid," "unauthorized," or "declined." The revocation of authorization can occur after one day, after three hours, after 8 hours, after the start of a new day, etc. In other embodiments, the system 10 revokes authorization of the user 60 upon an occurrence of an event, such as for example the departure of the user's flight. In other embodiments, the system 10 revokes authorization of the user 60 after a predetermined period of time after the occurrence of an event. For example, the system 10 may revoke the authorization of the user 60 ten minutes after the user's flight departs.

The method 200 may be altered in a variety of ways. For example, instead of the status of the registered access key being changed from a valid status to a status that is not valid at the step 245, the registered access key code may be deleted from the location in which it is stored, such as for example within the dynamic listing of codes. That is, when the system 10 determines whether the user 60 is authorized to access the secured area 246, the system 10 determines whether the boarding pass key code matches with any registered access key code. If there is no matching registered access key code, regardless of status, the user 60 is not authorized to access the secured area 246. If there is a matching registered access key code, regardless of status, the user 60 is authorized to access the secured area 246.

Figure 8:
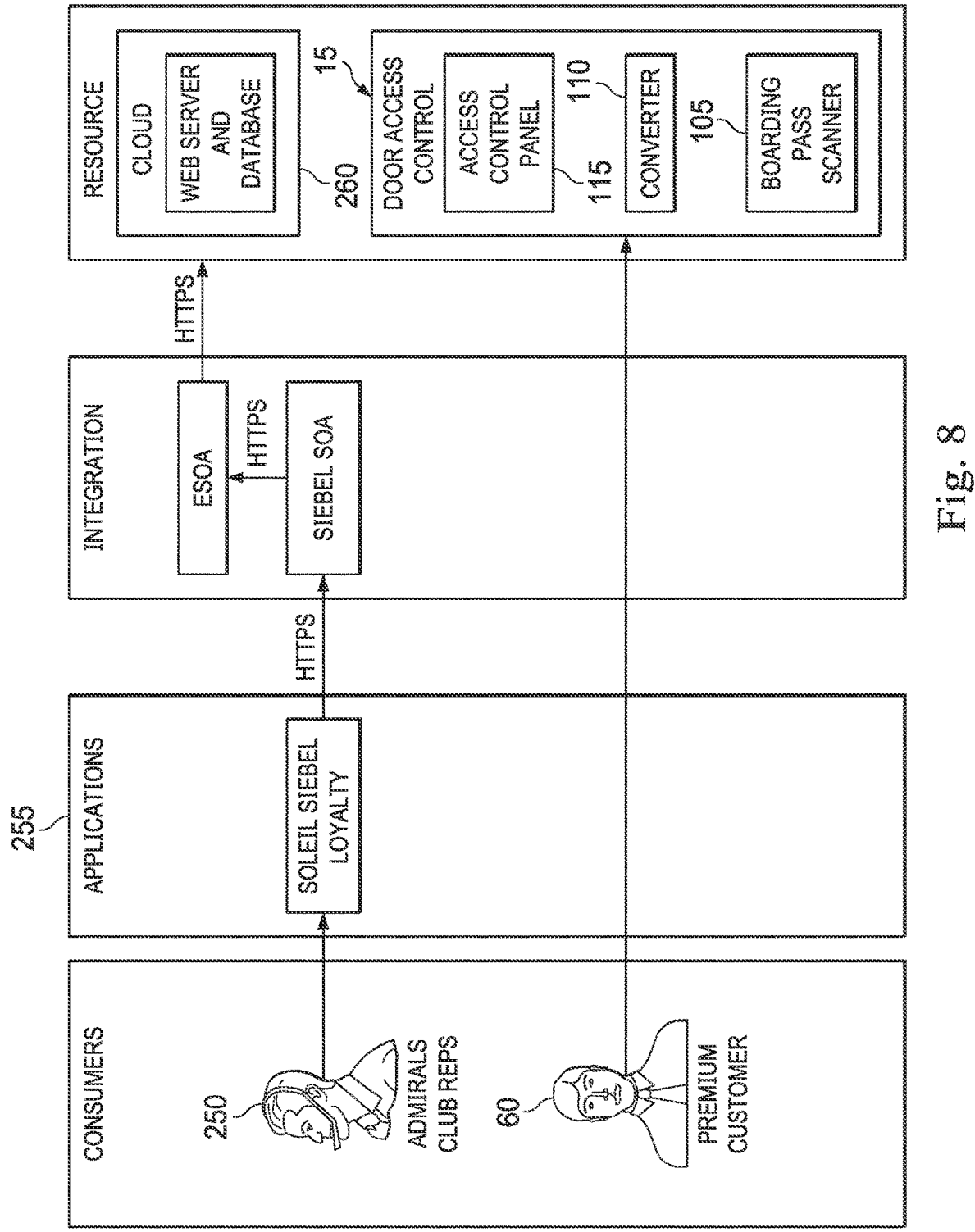
FIG. 8 illustrates a logical architecture associated with the system of FIG. 1, according to an example embodiment.
Figure 9:
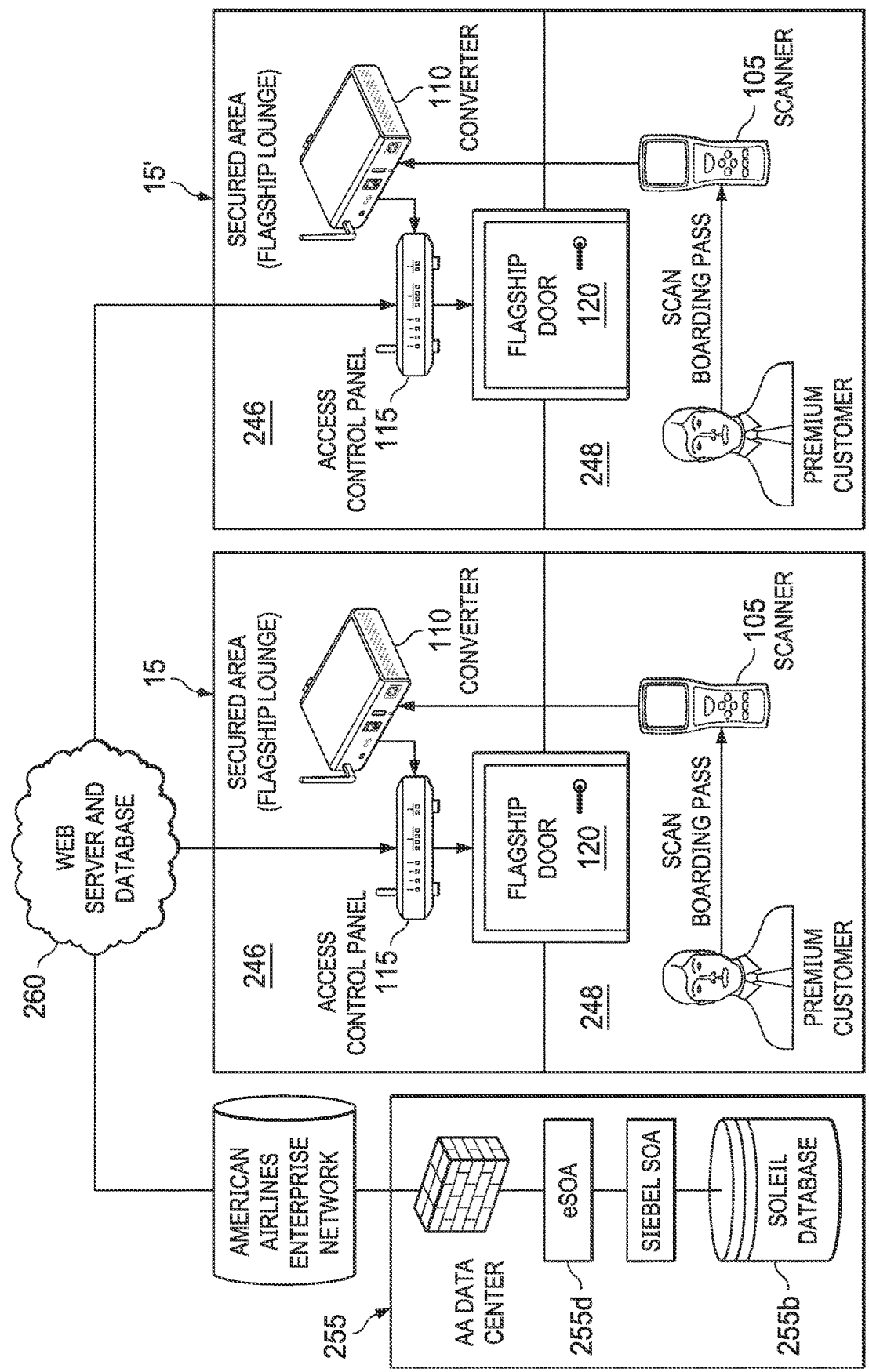
FIG. 9 illustrates a network flow associated with the system of FIG. 1, according to an example embodiment.

FIG. 8 illustrates a logical architecture associated with the system 10 and FIG. 9 illustrates a network flow associated with the system 10. As illustrated in FIG. 9, the cloud-based web server and database 260 receives data from the Soleil system 255, distributes a response to a query from the door assembly 15 regarding access of a user 60, and/or registers/downloads registered door key codes to more than one door assembly 15. That is, the registered door key codes or the listing of the registered door key codes can be sent to the door assembly 15 at a first location and a door assembly 15' that is identical or substantially similar to the door assembly 15 such that reference numerals used for the components of the door assembly 15 are used for the components of the door assembly 15' that is at a second location. The door assemblies 15 and 15' may provide access to the same secured area 246 or different secured areas. In some embodiments, the first location is at a first terminal or first airport and the second location is at a second terminal or second airport, with the first and second airports being different and the first and second terminals being different. In some embodiments, while the cloud-based web server and database 260 receives the travel details and the user details for all users in the system 10, the cloud-based web server and database 260 only sends the registered door key codes to doors that the user is granted access to. That is, if the user 60 is provided access to an airline lounge in DFW, the cloud-based web server and database (EBI) 260 sends the registered door key code to the doors that provide access to the lounge in DFW and not to doors that provide access to other lounges such as a lounge in LAX.

In some embodiments, the logical tiers include an objects layer, a service layer, a logical layer, and a data layer. In some embodiments, the objects layer includes "DoorUnlockUniqueKey" (service layer to logical layer); "DoorUnlockStatus" (service layer to logical layer); EBI employee definition (logical layer to data layer); and EBI event definition (logical layer to data layer). In some embodiments, the service layer includes "receive service invocations by ESOA" (registration notification, door event query, keep alive) and "dispatch to logical layer for processing." In some embodiments, the logical layer includes validating DoorUnlockUniqueKey input (PNR number, etc.); "translating DoorUnlockUniqueKey' to Employee definition and create"; searching for employee definitions that are active greater than one day and deleting those employee definitions; translating a local door unlock event to a DoorUnlockStatus Object; and tracking "keep alive timing" and "send timeout alarms" to the data layer. In some embodiments, the data layer includes create employee; search employee; delete employee; track status info; retrieve events for door; create application events/alarms; generate log messages; and retrieve application configuration.

In some embodiments, the system 10 also provides notifications to the ESOA web service of access events relating to the door assembly 15. That is, the system 10 tracks the opening and closing of doors, the use of doors by users, etc. Moreover, and in some embodiments, the system 10 utilizes a keep alive scheme between the ESOA and the cloud-based web server and database 260, requiring the ESOA to periodically invoke a keep alive endpoint. If the time between invocations exceeds a threshold, the cloud-based web server and database 260 will provide an alarm notification.

In some embodiments, using the system 10 and/or completing at least a portion of the method 200 allows the user 60 to use his or her boarding pass 50 as a credential for entering a secured access location, such as an airport lounge. When using the system 10 and/or completing at least a portion of the method 200, a door history report is created that details recent access at specific door assemblies. Moreover, an operator can view the doors that the user 60 has or had authorization to enter.

In some embodiments, using the system 10 and/or completing at least a portion of the method 200 creates a unified experience for the user 60. In some embodiments, the system 10 reads boarding passes and generates a door key for exclusive lounge access. In some embodiments, using the system 10 and/or completing at least a portion of the method 200 temporarily grants passengers or users access to the secured area 246, or lounge area, upon check-in at the customer service center 250, which may be a club front desk. The temporary grant of access occurs automatically, via the network-based solution as described above.

In some embodiments, the system 10 and/or completing at least a portion of the method 200 enables a seamless customer experience by reading the boarding pass for check-in and generating the door key for the lounge access by the Soleil system 255.

In some embodiments, the door assembly 15 includes an elevator and granting access to the secured area 246 includes allowing the elevator to stop at a specific floor or allowing the elevator to move from another floor. In some embodiments, the door assembly 15 does not include a traditional door panel and instead, the door assembly 15 monitors an open passageway for users that are not authorized and emits an alarm if an unauthorized user passes, or attempts to pass, through the open passageway.

In some embodiments, the system 10 validates the customer flight data in real-time, which unlocks and/or opens the door assembly 15 and allows the customer or the user 60 to access the secured area 246. That is, the customer or user 60 is not required to check in at the customer service center 250. In some embodiments, the scanner 105 is configured to identify the user 60 based on a fingerprint, facial scan, or eye scan, and the method 200 includes the user 60 providing a fingerprint, facial scan, or eye scan at the step 210. In this example, the boarding pass 50 is not required, and the system 10, upon identification of the user 60 via the fingerprint, facial scan, or eye scan, identifies upcoming travel plans associated with the user 60 and identifies whether the user 60 is eligible for access to the secured area 246. In some embodiments, the user 60 is eligible for access when the user 60 is a member of a club or when the user 60 has paid for access to the secured area 246. Regardless, if the user 60 is eligible for access and the upcoming travel plans meet authorization requirements, then the system 10 provides access to the secured area 246 to the user 60 via the door assembly 15. In some embodiments, the authorization requirements include a time-dependent parameter and a location-specific parameter. For example, the time-dependent parameter includes a window of time prior to the departure of a flight in which the user 60 is associated. Generally, the window of time is 3 hours prior to the departure of the flight in which the user 60 is associated. That is, the user 60 is allowed access to the secured area 246 three hours prior to the departure of the flight and until the departure of his or her flight. Generally, the user 60 cannot access the secured area 246 four hours or five hours prior to the departure, unless other conditions are met (e.g., layover, delay, etc.). In some embodiments, the location-specific parameter requires that the origination location associated with the flight in which the user 60 is associated is the same location as the secured area 246. That is, if the user 60 is flying out of DFW, then the user 60 is given access to secured area(s) 246 in DFW and not LAX.

In some embodiments, the Soleil system 255 creates an outbound web service to send the details of the user 60 to the cloud-based web server and database 260 upon registration of the user 60 at the customer service center 250. In some embodiments, the Soleil system 255 creates an inbound web service for the cloud-based web server and database 260 to send the door status and user 60 details to the Soleil system 255.

In some embodiments, each of the scanner 105, the converter 110, and the access control panel 115 include a computer processor and a computer readable medium operably coupled thereto. Instructions accessible to, and executable by, the computer processor are stored on the computer readable medium. A database is also stored in the computer readable medium. In some embodiments, the processor associated with each of the mobile device 55, the scanner 105, the converter 110, and/or the access control panel 115 is remote from a processor associated with the Soleil system 255 and the cloud-based web server and database 260.

In some embodiments, the system 10 also includes a firewall separating the cloud-based web server and database 260 from the Soleil system 255 and a firewall separating the cloud-based web server and database 260 from the door assembly 15. In some embodiments, the firewall is a SonicWall TZ series from SonicWall, Inc. of Santa Clara, CA, USA.

In some embodiments, the system 10 transforms the state of the door assembly 15 from the first configuration to the second configuration and from the second configuration to the first configuration based on a scan of a boarding pass 50, or other identifier, of the user 60.

The scanning of the boarding pass 50 for entry to the secured area 246 can replace the need for physical keys, which are often misplaced or kept by users. Physical, conventional keys include keys having a bit or other mechanical element that is inserted into a lock and as well as access cards that are programmed to allow access via swiping a magnetic strip or via proximity and the use of radio waves. Physical keys can also include the use of Bluetooth technology to unlock a lock. None of the physical, conventional keys unlock a lock or grant access solely based on a graphical, or visual, element (e.g., code 95). Moreover, locks paired with the physical, conventional keys that rely on programming instead of strictly on a mechanical element are not capable of opening for a listing of allowed users that changes over time. In some embodiments, the system 10 reads the code 95 to determine whether the user 60 associated with the code 95 is allowed access. In this embodiment, the code 95 is passive in that it does not attempt to make a connection with the scanner 105 and is static in that the code 95 does not change once created. As such, it is the door assembly 15 that determines, based on the information received from the code 95, whether the user 60 is granted access. As there are hundreds and/or thousands of users and associated codes of the system 10, the system 10 references a listing of approved codes (e.g., registered access key code with a status of valid or registered access key code without a status) when determining whether the user 60 is allowed access. Considering the access to the secured area 246 is generally dependent on the departure of flights and that the number of departing flights is in the hundreds or thousands, the number of authorized users and associated approved codes is in the hundreds or thousands and is changing as flights depart and as the departure time for a user's flight is within a predetermined period of time. The door assembly 15 references a dynamic listing of approved codes when comparing the boarding pass key code with the registered access key code. In some embodiments, the dynamic listing of approved codes includes hundreds, thousands, or hundreds of thousands of registered access key codes. In some embodiments, the door assembly 15 does not send any information or data to the code 95. That is, and unlike locks or access systems using Bluetooth technology, the door assembly 15 does not transmit any keys or communications to the code 95.

While the system 10 is described herein with reference to an airline industry, in some embodiments the travel document is a travel document related to rail or train travel, bus or other automotive travel, and/or shipping or boat travel. As such, instead of the secured area 246 being an airline lounge and the less-secure 248 area being an airport terminal, the secured area 246 may be a passenger lounge and the less-secure area 248 may be a train station, a bus station, or a passenger waiting area for a shipping operator.

In one or more example embodiments, each of the applications is stored in the non-transitory computer readable medium. In some embodiments, the application includes and/or executes one or more web-based programs, Intranet-based programs, and/or any combination thereof. In an example embodiment, the application includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous JavaScript and XML (Ajax), iOS, xCode, Swift, Android for mobile, and/or any combination thereof. In an example embodiment, the application is a web-based application written in, for example, Java or Adobe Flex, which pulls real-time information from another computer and/or a plurality of data sources. In an example embodiment, the application pulls real-time information from the plurality of data sources, upon the execution, opening or start-up of the application. In an example embodiment, the application is stored on the computer readable medium and/or in the database.

Figure 10:
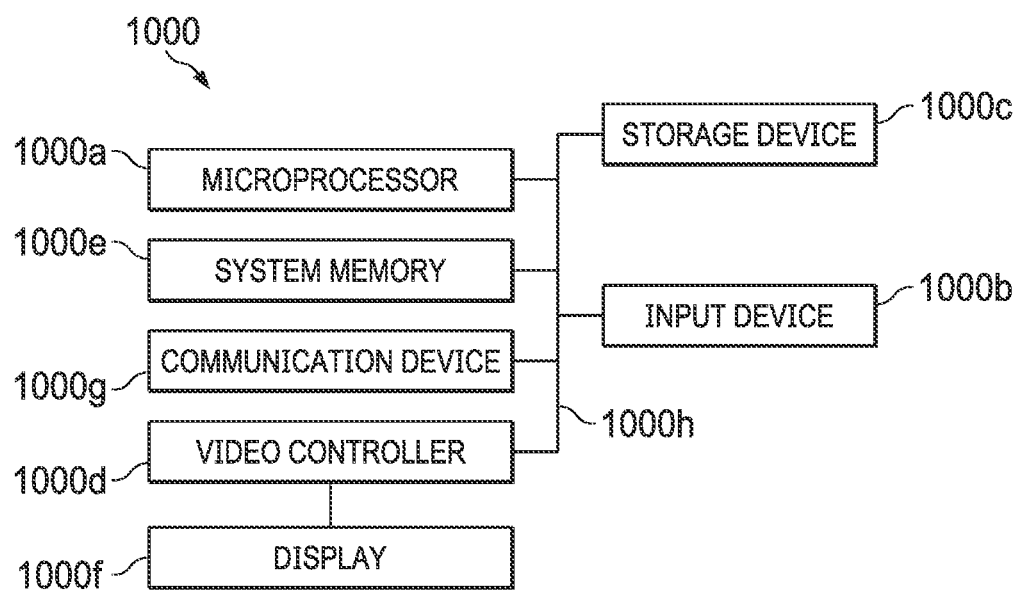
FIG. 10 is a diagrammatic illustration of a node for implementing one or more example embodiments of the present disclosure, according to an example embodiment.

In an example embodiment, as illustrated in FIG. 10 with continuing reference to FIGS. 1-9, an illustrative node 1000 for implementing one or more of the example embodiments described above and/or illustrated in FIGS. 1-9 is depicted. The node 1000 includes a microprocessor 1000$a$, an input device 1000$b$, a storage device 1000$c$, a video controller 1000$d$, a system memory 1000$e$, a display 1000$f$, and a communication device 1000$g$ all interconnected by one or more buses 1000$h$. In several example embodiments, the storage device 1000$c$ may include a thumb drive, hard drive, CD-ROM, optical drive, any other form of storage device and/or any combination thereof. In several example embodiments, the storage device 1000$c$ may include, and/or be capable of receiving, a floppy disk, CD-ROM, DVD-ROM, or any other form of computer-readable medium that may contain executable instructions. In several example embodiments, the communication device 1000$g$ may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1-9 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-9 include respective pluralities of same components.

In several example embodiments, one or more of the applications, systems, and application programs described above and/or illustrated in FIGS. 1-9 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions The present disclosure introduces a method of selectively granting access to a secured area via a door assembly that is positioned between a first area and the secured area, wherein the method comprises: reading, using a scanner accessible from the first area, a scannable code to identify travel details associated with a user and user details associated with the user; wherein the scannable code forms a portion of a travel document; generating, using the converter, a first access key code based on the identified travel details and the identified user details; determining that the user is authorized to enter the secured area by comparing the first access key code to a registered access key code; and granting access to the secured area via the door in response to the determination that the user is authorized to enter the secured area. In one embodiment, comparing the first access key code to the registered access key code comprises determining that the first access key code is identical to the registered access key code. In one embodiment, the method also includes generating, using a processor that is remote from a control panel in communication with the converter, the registered access key code; and sending, from the processor and to the control panel, the registered access key code; wherein the control panel compares the registered access key code to the first access key code to determine that the user is authorized to enter the secured area. In one embodiment, the method also includes generating, using a processor that is remote from a control panel in communication with the converter, the registered access key code; and sending, from the door assembly and to the processor, the first access key code; wherein the processor compares the registered access key code to the first access key code to determine that the user is authorized to enter the secured area. In one embodiment, the first access key code is a Wiegand code comprising at least portions of the identified travel details and at least portions of the identified user details. In one embodiment, the Wiegand code comprises a passenger name record associated with the user, a flight number, letters of a first name of the user, letters of a last name of the user, and an origination location. In one embodiment, determining that the user is authorized to enter the secured area further comprises identifying a status associated with the registered access key code; and granting access to the secured area via the door is in further response to the status. In one embodiment, granting access to the secured area via the door is in further response to the status being a status of valid. In one embodiment, the method also includes changing the status from the status of valid to a status of not valid after a predetermined period of time thereby revoking authorization to enter the secured area. In one embodiment, the registered access key code is one of a plurality of registered access key codes that forms a dynamic listing of approved codes and that is accessible by the door assembly. In one embodiment, the door assembly further comprising a lock, and wherein granting access to the secured area comprises unlocking the lock. In one embodiment, the travel document is a boarding pass.

The present disclosure introduces system that includes a door that selectively grants access to a secured area from a first area; a scanner accessible from the first area, wherein the scanner is configured to read a scannable code of a travel document to identify travel details of a user and user details that are represented by the scannable code; a converter in communication with the scanner, wherein the converter is configured to generate a first access key code based on the identified travel details and the identified user details; and a control panel in communication with the converter, wherein the control panel is configured to grant access to the secured area via the door in response to a comparison of the first access key code to a registered access key code. In one embodiment, the system also includes a processor that is in communication with the control panel and that is remote from the control panel; wherein the processor is configured to generate the registered access key code and to send the registered access key code to the control panel; and wherein the control panel makes the comparison of the registered access key code to the first access key code. In one embodiment, the system also includes a processor that is in communication with the control panel and that is remote from the control panel; wherein the control panel is further configured to transmit the first access key code to the processor; and wherein the processor generates the registered access key code and makes the comparison of the registered access key code to the first access key code. In one embodiment, the first access key code is a Wiegand code comprising at least portions of the identified travel details and at least portions of the identified user details. In one embodiment, the Wiegand code comprises a passenger name record associated with the user, a flight number, letters of a first name of the user, letters of a last name of the user, and an origination location. In one embodiment, during the comparison of the registered access key code to the first access key code a status associated with the registered access key code is identified; and access is granted in further response to the status. In one embodiment, the system also includes a lock, and wherein the lock is unlocked to grant access to the secured area. In one embodiment, the registered access key code is one of a plurality of registered access key codes that forms a dynamic listing of approved codes and that is accessible by the control panel. In one embodiment, the travel document is a boarding pass.

In several example embodiments, the elements and teachings of the various illustrative example embodiments may be combined in whole or in part in some or all the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of granting access to a secured area via a door assembly that is positioned between a first area and the secured area, wherein the method comprises:
scanning, using a scanner in the first area, user details associated with a user to identify the user,
wherein the user details include a fingerprint, a facial scan, or an eye scan;
identifying, using one or more processors and based on the user details, the identity of the user;
identifying, using the one or more processors and the identity of the user, travel details associated with the user,
wherein the travel details comprise a scheduled flight departure time;
determining, using the one or more processors, that the user is authorized to enter the secured area based on the travel details and the user details;
wherein determining, using the one or more processors, that the user is authorized to enter the secured area based on the travel details and the user details occurs at a point in time and comprises determining whether the point in time is within a window of time prior to the scheduled flight departure time;
and
automatically granting access to the secured area via the door assembly in response to determining, using the one or more processors, that the user is authorized to enter the secured area based on the travel details and the user details.

2. The method of claim 1, further comprising:
revoking the user's authorization to enter the secured area;
wherein the user's authorization to enter the secured area is revoked after:
an occurrence of an event; and/or
a predetermined period of time.

3. The method of claim 1, wherein granting access to the secured area comprises unlocking a lock of the door assembly.

4. The method of claim 1,
wherein determining that the user is authorized to enter the secured area further comprises identifying a status associated with the travel details and the user details; and
wherein access to the secured area is automatically granted in response to identifying the status as valid.

5. The method of claim 4, further comprising:
changing the status from the status of valid to a status of not valid after a predetermined period of time, thereby revoking the user's authorization to enter the secured area.

6. A method of granting access to a secured area via a door assembly that is positioned between a first area and the secured area, wherein the method comprises:
identifying, by a reader in the first area, travel details associated with a user and user details associated with the user,
wherein the reader identifies the travel details and the user details from a travel document;
generating a first access key code based on the travel details and the user details;
determining, using one or more processors, that the user is authorized to enter the secured area based on the travel details identified by the reader and the user details identified by the reader;
wherein determining that the user is authorized to enter the secured area comprises comparing the first access key code to a registered access key code;
and
automatically granting access to the secured area via the door assembly in response to determining, using the one or more processors, that the user is authorized to enter the secured area based on the travel details identified by the reader and the user details identified by the reader.

7. The method of claim 6, wherein the registered access key code is one of a plurality of registered access key codes forming a dynamic listing of approved codes.

8. The method of claim 6, wherein the travel document is a boarding pass.

9. The method of claim 6, further comprising:
revoking the user's authorization to enter the secured area;
wherein the user's authorization to enter the secured area is revoked after:
an occurrence of an event; and/or
a predetermined period of time.

10. The method of claim 6, wherein granting access to the secured area comprises unlocking a lock of the door assembly.

11. The method of claim 6,
wherein determining that the user is authorized to enter the secured area comprises identifying a status associated with the travel details and the user details; and
wherein access to the secured area is automatically granted in response to identifying the status as valid.

12. The method of claim 11, further comprising:
changing the status from the status of valid to a status of not valid after a predetermined period of time, thereby revoking the user's authorization to enter the secured area.

13. A method of granting access to a secured area via a door assembly that is positioned between a first area and the secured area, wherein the method comprises:
reading, using a scanner in the first area, a scannable code to identify details associated with a user;
generating, using one or more processors, a first access key code based on the identified details associated with the user;
determining that the user is authorized to enter the secured area, comprising comparing the first access key code to a registered access key code;
and
granting access to the secured area via the door assembly in response to determining that the user is authorized to enter the secured area.

14. The method of claim 13, further comprising:
revoking the user's authorization to enter the secured area;
wherein the user's authorization to enter the secured area is revoked after:
an occurrence of an event; and/or
a predetermined period of time.

15. The method of claim 13,
wherein the first access key code is generated using a converter;
wherein the registered access key code is sent to a control panel, which is in communication with the converter; and
wherein the control panel compares the first access key code to the registered access key code to determine that the user is authorized to enter the secured area.

16. The method of claim 13, wherein the first access key code is a Wiegand code comprising at least portions of the identified details associated with the user.

17. The method of claim 13, wherein the registered access key code is one of a plurality of registered access key codes forming a dynamic listing of approved codes.

18. The method of claim 13, wherein determining that the user is authorized to enter the secured area further comprises identifying as valid a status associated with the registered access key code.

19. The method of claim 18, further comprising:
changing the status from the status of valid to a status of not valid after a predetermined period of time, thereby revoking the user's authorization to enter the secured area.

20. A system configured to grant access to a secured area via a door assembly that is positioned between a first area and the secured area, wherein the system comprises one or more processors executing instructions comprising:
reading, using a scanner in the first area, a scannable code to identify details associated with a user;
generating a first access key code based on the identified details associated with the user;

determining that the user is authorized to enter the secured area, comprising comparing the first access key code to a registered access key code; and granting access to the secured area via the door assembly in response to determining that the user is authorized to enter the secured area.

21. The system of claim 20, wherein the instructions further comprise:
revoking the user's authorization to enter the secured area;
wherein the user's authorization to enter the secured area is revoked after: an occurrence of an event; and/or a predetermined period of time.

22. The system of claim 20, wherein the first access key code is a Wiegand code comprising at least portions of the identified details associated with the user.

23. The system of claim 20, wherein the registered access key code is one of a plurality of registered access key codes forming a dynamic listing of approved codes.

24. The system of claim 20, wherein determining that the user is authorized to enter the secured area further comprises identifying as valid a status associated with the registered access key code.

25. The system of claim 24, wherein the instructions further comprise:
changing the status from the status of valid to a status of not valid after a predetermined period of time, thereby revoking the user's authorization to enter the secured area.

26. A system, comprising:
a door assembly positioned between a secured area and a first area;
a scanner configured to read, in the first area, a scannable code to identify details of a user that are represented by the scannable code;
a converter in communication with the scanner, wherein the converter is configured to generate a first access key code based on the identified user details; and
a control panel configured to grant access to the secured area via the door assembly in response to a comparison of the first access key code to a registered access key code.

27. The system of claim 26, further comprising:
a processor in communication with the control panel;
wherein the processor is configured to generate the registered access key code and to send the registered access key code to the control panel; and
wherein the control panel compares the first access key code to the registered access key code.

28. The system of claim 26, further comprising:
a processor in communication with the control panel;
wherein the control panel is further configured to transmit the first access key code to the processor; and
wherein the processor generates the registered access key code and compares the first access key code to the registered access key code.

29. The system of claim 26, further comprising:
identifying as valid a status associated with the registered access key code; and
changing the status from the status of valid to a status of not valid after a predetermined period of time, thereby revoking the user's authorization to enter the secured area.

30. The system of claim 26, wherein the door assembly comprises a lock; and
wherein the lock is unlocked to grant access to the secured area.

31. The system of claim 26, wherein the registered access key code is one of a plurality of registered access key codes forming a dynamic listing of approved codes.

* * * * *